(12) United States Patent
Meduri et al.

(10) Patent No.: US 8,763,397 B1
(45) Date of Patent: Jul. 1, 2014

(54) DEVICE AND PROCESS TO REDUCE PRESSURE AND TEMPERATURE LOSS FROM A SOLAR THERMAL RECEIVER

(76) Inventors: Phani K. Meduri, Pasadena, CA (US); James E. Pacheco, Sierra Madre, CA (US); Andrew Heap, Pasadena, CA (US)

( * ) Notice: Subject to any disclaimer, the term of this patent is extended or adjusted under 35 U.S.C. 154(b) by 246 days.

(21) Appl. No.: 13/069,279

(22) Filed: Mar. 22, 2011

Related U.S. Application Data

(60) Provisional application No. 61/316,774, filed on Mar. 23, 2010.

(51) Int. Cl.
*F03G 6/00* (2006.01)
*F01K 13/02* (2006.01)
*F01K 19/00* (2006.01)
*F24J 2/40* (2006.01)

(52) U.S. Cl.
USPC ........... 60/641.8; 60/646; 60/641.15; 60/657; 126/572

(58) Field of Classification Search
USPC ............... 60/641.8–641.15, 646, 652, 653, 60/657–659; 126/572–575, 601, 602, 615
See application file for complete search history.

(56) References Cited

U.S. PATENT DOCUMENTS

| | | | | |
|---|---|---|---|---|
| 3,882,680 A | * | 5/1975 | Durrant et al. | 60/646 |
| 4,171,617 A | * | 10/1979 | Sakamoto et al. | 60/641.8 |
| 4,485,803 A | * | 12/1984 | Wiener | 126/591 |
| 4,487,166 A | * | 12/1984 | Haller et al. | 122/406.5 |
| 4,556,018 A | * | 12/1985 | Agata | 122/35 |
| 4,790,269 A | * | 12/1988 | Hamill et al. | 122/406.5 |
| 6,996,988 B1 | * | 2/2006 | Bussard | 60/641.8 |

* cited by examiner

*Primary Examiner* — Thomas Denion
*Assistant Examiner* — Laert Dounis
(74) *Attorney, Agent, or Firm* — Brooks Acordia IP Law, P.C.; Pejman Yedidsion; Christopher Weiss

(57) ABSTRACT

A solar-thermal receiver with a superheater isolation valve is disclosed. The superheater isolation valve is positioned so as to impede the transfer of steam from a steam drum or vertical separator into a superheater. The decays in temperature and pressure, within components of a solar-thermal receiver system that may occur throughout the shutdown period of a solar-thermal receiver, may be reduced or minimized.

7 Claims, 8 Drawing Sheets

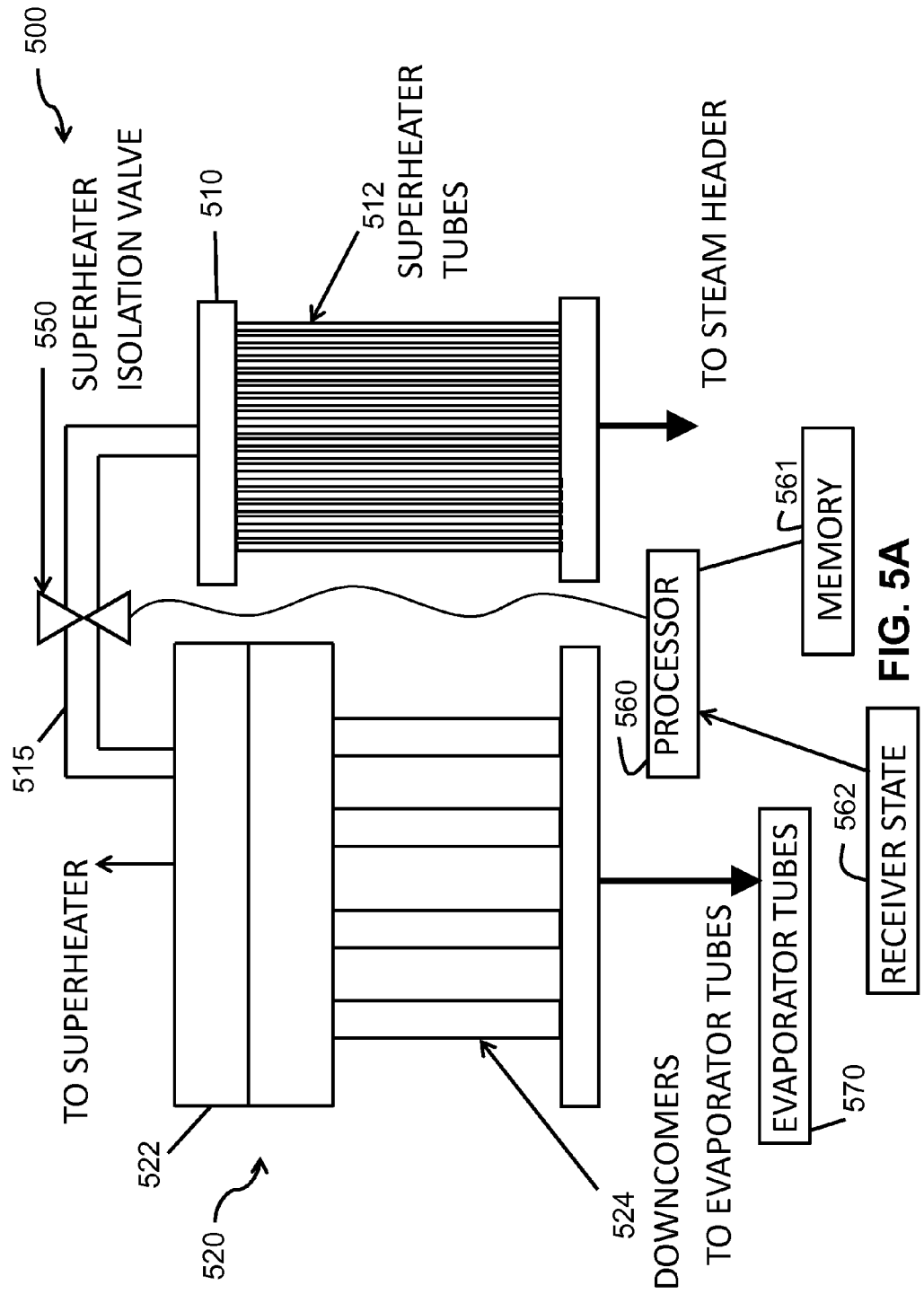

DEVICE AND PROCESS TO REDUCE PRESSURE AND TEMPERATURE LOSS FROM A SOLAR THERMAL RECEIVER

CROSS-REFERENCE TO RELATED APPLICATION

This application claims the benefit of U.S. Provisional Patent Application Ser. No. 61/316,774 filed Mar. 23, 2010, which is hereby incorporated by reference herein for all purposes.

FIELD OF ENDEAVOR

Embodiments pertain to the reduction of pressure and temperature loss from solar-thermal receivers. In particular, embodiments relate to a superheater isolation valve configured to reduce or minimize the transfer of fluid mass from a steam drum or a vertical separator to a superheater.

BACKGROUND

Solar-thermal receiver systems rapidly lose pressure and temperature upon shutdown due to thermal losses at various components. Superheaters of a solar-thermal receiver are typically directly connected to the evaporator section of the receiver. Therefore, when the receiver is shut down, the steam volume present in the superheater condenses due to a heat transfer to the ambient. Accordingly, pressure in the superheater typically drops, and these pressure drops result in a steam flow into the superheater. This steam flow condenses until pressure reaches ambient. Condensed water in the superheater is typically drained, and accordingly its work potential is wasted. That is, since the condensed water in the superheater is drained and is wasted, operation of the receiver can result in wastage of high quality, chemically treated water. Furthermore, the pressure and temperature losses prolong or otherwise delay the start of an efficient use of the receiver startup time.

Once the receiver is shut down in the evening, it starts to lose pressure and temperature due to thermal losses at various receiver components. FIG. 1 depicts components 100 of a solar thermal receiver assembly. The superheaters 110 of the receiver may be directly connected, e.g., via a fluid conduit 115, to the evaporator section 120 of the receiver. When the receiver is shut down at the end of a cycle, or when the vertical separator pressure reaches ambient, the drum or vertical separator temperature of the day, steam volume present in the superheater section 110 condenses due to heat transfer to the ambient via convection, radiation, and conduction losses. When steam condenses in the superheater, e.g., in the superheater tubes 112, the pressure in the superheater may drop, resulting in steam flow from the drum 122 into the superheater 110. This direction of steam flow acts to lower the pressure in the drum 122 or vertical separator. In turn, this lowering of pressure causes the saturated water to flash in the drum 122 of the evaporator—so as to maintain equilibrium. The steam that entered the superheater 110 from the drum 122 condenses again, and the process continues until the pressure in the drum 122, or vertical separator, reaches ambient. Once the drum 122, or vertical separator, reaches ambient, the temperature of the drum 122, or vertical separator, continues to decline—but at a much slower rate than before reaching ambient. This change in the rate of decline may primarily be due to conductive heat loss from the insulation on the drum 122, or vertical separator, and downcomers 124.

SUMMARY

Embodiments include a solar-thermal receiver for reducing or minimizing temperature and pressure decay that may occur throughout the shutdown period. In exemplary embodiments, the receiver includes a superheater isolation valve for impeding the transfer of steam from a steam drum, or a vertical separator, into a superheater. The superheater isolation valve is positioned between a superheater and an evaporator and may be a stop valve or a flow control valve with zero leakage flow. The superheater isolation valve remains open when the receiver is in operation, but may close at the end of the day or in a cloud standby mode.

Accordingly, solar-thermal receiver assembly embodiments may comprise: (a) a steam drum, or vertical separator; (b) a superheater; (c) a fluid conduit disposed between the steam drum to the superheater; and (d) a superheater isolation valve interposed in the fluid conduit between the steam drum and the superheater, and wherein the superheater isolation valve is actuatable. In some embodiments, the superheater isolation valve is a stop valve, and may include a bypass valve, and in some embodiments, the superheater isolation valve is a flow control valve with zero leakage flow. Embodiments may comprise a processor configured to generate valve actuation signals based on a detected solar-thermal receiver system state, e.g., measure temperature and/or pressure of components of the solar-thermal receiver system.

Embodiments include methods of preserving heat and pressure within components of a solar-thermal receiver system. For example, a method/process of preserving heat and pressure in a solar-thermal receiver may comprise: (a) determining, by a processor having addressable memory, whether solar flux is incident on a receiver; (b) if solar flux is incident on a receiver, then generating an actuating command for a superheater isolation valve interposed along a fluid conduit between a steam drum, or vertical separator, and a superheater to an open position; and (c) otherwise, if the solar flux is not incident on the receiver, then generating an actuating command for the superheater isolation valve interposed along the fluid conduit between the steam drum and the superheater. The exemplary actuating commands may drive a motor, such as a proportion motor, that may in turn rotate the superheater isolation valve in one or two angular directions. The exemplary actuating command may drive a motor that drives open an otherwise spring-loaded-to-close superheater isolation valve. Some method/process embodiments may further comprise: determining, by the processor, a solar-thermal receiver state based on measuring pressure and temperature incident to the superheater. Some method/process embodiments may further comprise: setting a minimum pressure and temperature, by the processor, and wherein determining is via a measured pressure and temperature incident to the superheater greater than the set minimum pressure and temperature. In some embodiments, the superheater isolation valve is a stop valve, and in some embodiments, the superheater isolation valve is a flow control valve with zero leakage flow. Some method/process embodiments may further comprise: (a) determining a range of temperature and pressure values, by the processor, wherein the range of temperature and pressure values are between a set of minimum values and a set maximum values for temperature and pressure; and (b) if the measured pressure and temperature incident to the superheater is within the determined range of temperature and pressure vales, then generating an actuating command for the superheater isolation valve to a position between fully open and fully closed, wherein the actuated position of the superheater isolation valve corresponds to the determined range of temperature and pressure values. Some method/process embodiments may further comprise: setting a minimum and maximum values for temperature and pressure, by the processor. Some method/process embodiments may further comprise: interposing a superheater isolation valve along a fluid conduit between a steam drum and a superheater, wherein the superheater isolation valve is actuatable via a processor configured to determine a state of the solar-thermal receiver.

BRIEF DESCRIPTION OF THE DRAWINGS

Embodiments are illustrated by way of example and not limitation in the figures of the accompanying drawings in which:

FIG. 5A is an exemplary schematic of a receiver with a superheater isolation valve;

DETAILED DESCRIPTION

In a receiver without a superheater isolation valve, a transfer of fluid mass from the steam drum, or vertical separator, into the superheater occurs. Typically, the fluid that transfers into the superheater is drained upon condensation, and is wasted as a working fluid. Maximizing revenue generation in a solar thermal power generating station of a power plant may be related to minimizing the effective startup time of the solar thermal receivers, and hence the effective startup time of the power plant itself. The solar-thermal receiver startup time may be a function of the state of the receiver at sunrise, which may include the pressure and temperature of the receiver's heat transfer fluid, i.e., the higher those are at sunrise, the more reduced is the requisite startup time. While various receiver sizes and/or geometries may produce different specific pressure decay curves, the addition of an isolation valve, operated in the method and via the system according to the teachings herein, may offer much longer pressure and temperature decay times.

The superheater isolation valve also may ensure that the steam from the steam drum, or vertical separator, does not transfer into the superheater. This helps in preserving the expensive reverse osmosis and chemically treated water. Since this water is hot, this may also help in expediting the startup time for the next cycle, e.g., for the next morning.

Accordingly, method, device, and system embodiments of the present invention may reduce or minimize pressure decay over a period of time, such as overnight, enable faster system startup the next morning, and thus result in greater electricity generation over the course of the day. Embodiments of the present invention impede, or prevent, the mass transfer of water from the evaporator to the superheater—water that may be purified by reverse osmosis and chemically treated in the evaporator, and accordingly maintains or preserves the water level in the evaporator. Embodiments of the invention maintain high temperature and high pressure in the receiver, e.g., overnight, and device embodiments, by themselves, or when used in conjunction with other active heating devices, may also provide freeze protection to the receiver. That is, the thermal inertia may be tapped into during the freezing nights by circulating the water from the drum, or vertical separator, through the evaporator tubes susceptible to freezing.

Figure 1:
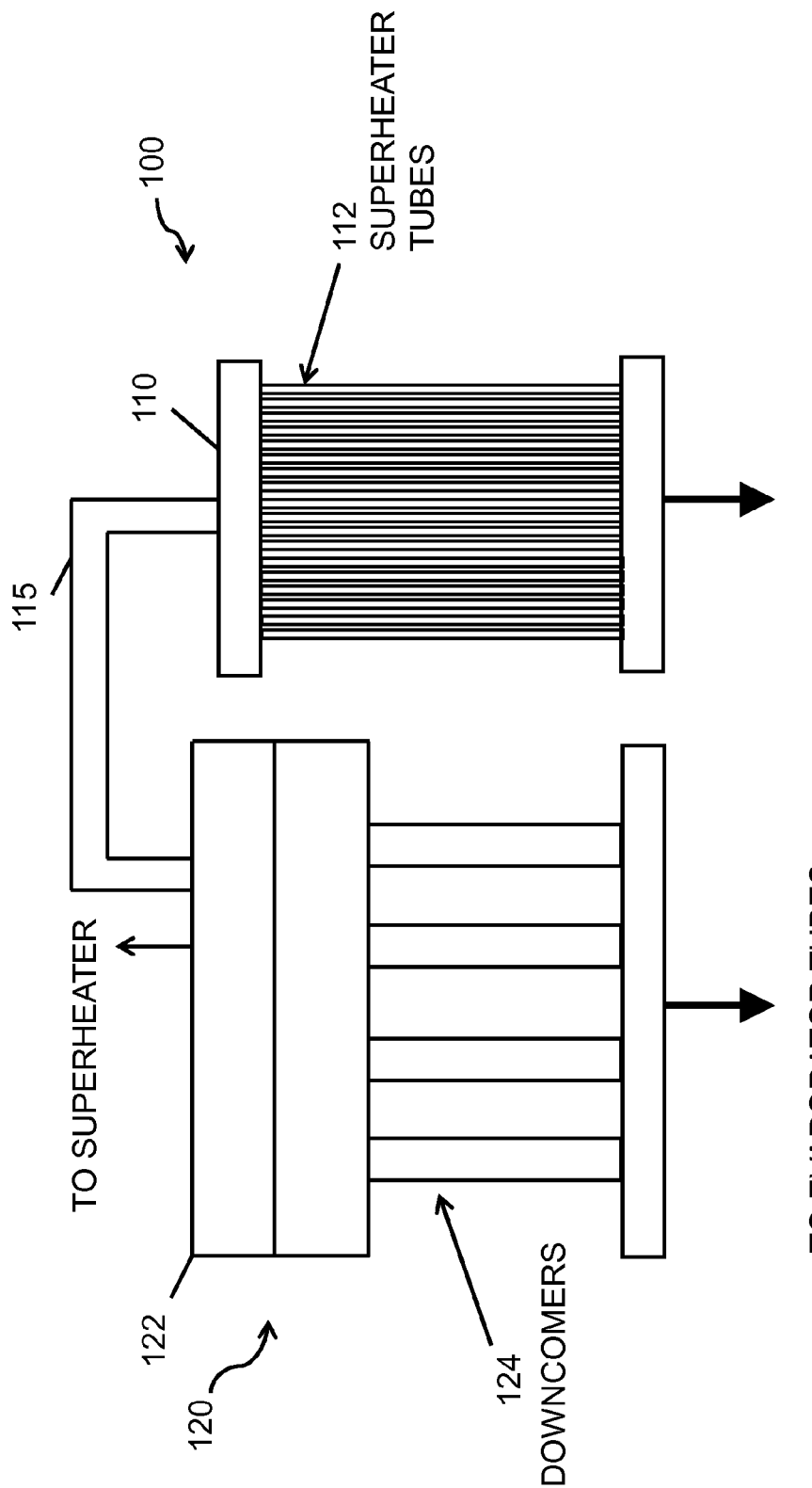
FIG. 1 depicts components of a solar thermal receiver.
Figure 2:
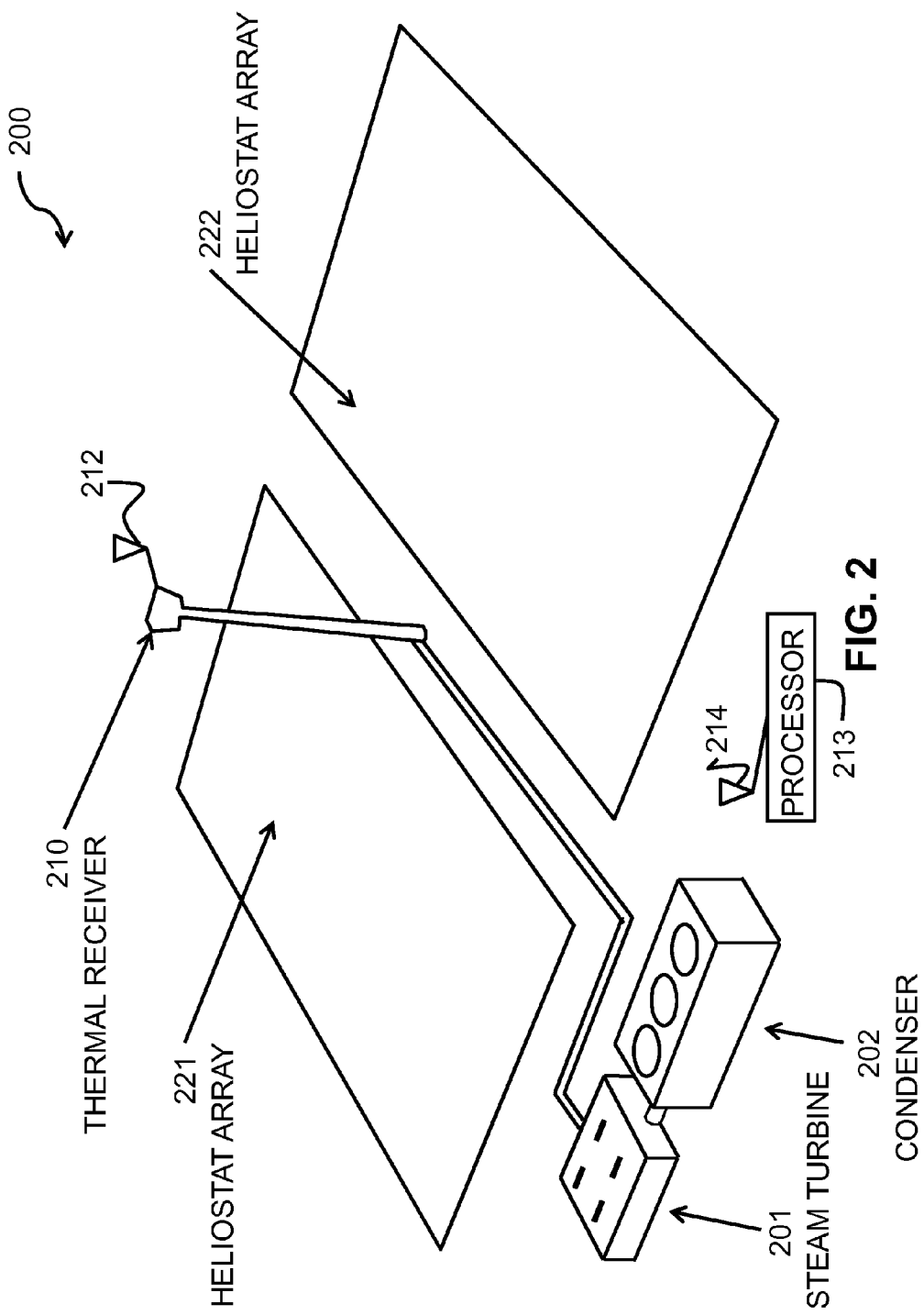
FIG. 2 is a depiction of an exemplary solar thermal receiver disposed in an exemplary heliostat-based plant.

Embodiments include an exemplary central-tower solar thermal receiver architecture 200 as shown in FIG. 2, including a steam turbine 201 and a condenser 202. FIG. 2 depicts an exemplary solar thermal receiver 210. One or more photodiodes, cameras, and other light sensors may be mounted on, or positioned to be looking at, the receiver. Accordingly, these one or more light-sensing elements may be used to detect and, by way of a processing unit, trigger the closing and/or opening of a superheater isolation valve, and/or a bypass valve. In a central-tower solar thermal power plant, a field of heliostats 221, 222 may be used to concentrate reflected sunlight onto the solar-thermal receiver 210 depicted as mounted atop a tower, and may include wired and/or wireless communication 212 with a processor 213 that may include a receiving antenna 214. This exemplary solar-thermal receiver 210 may absorb the incident concentrated sunlight and may convert the absorbed sunlight into useful thermal energy. In an exemplary embodiment, such a conversion may be accomplished by transferring the solar energy to water, and generating superheated steam.

Figure 3:
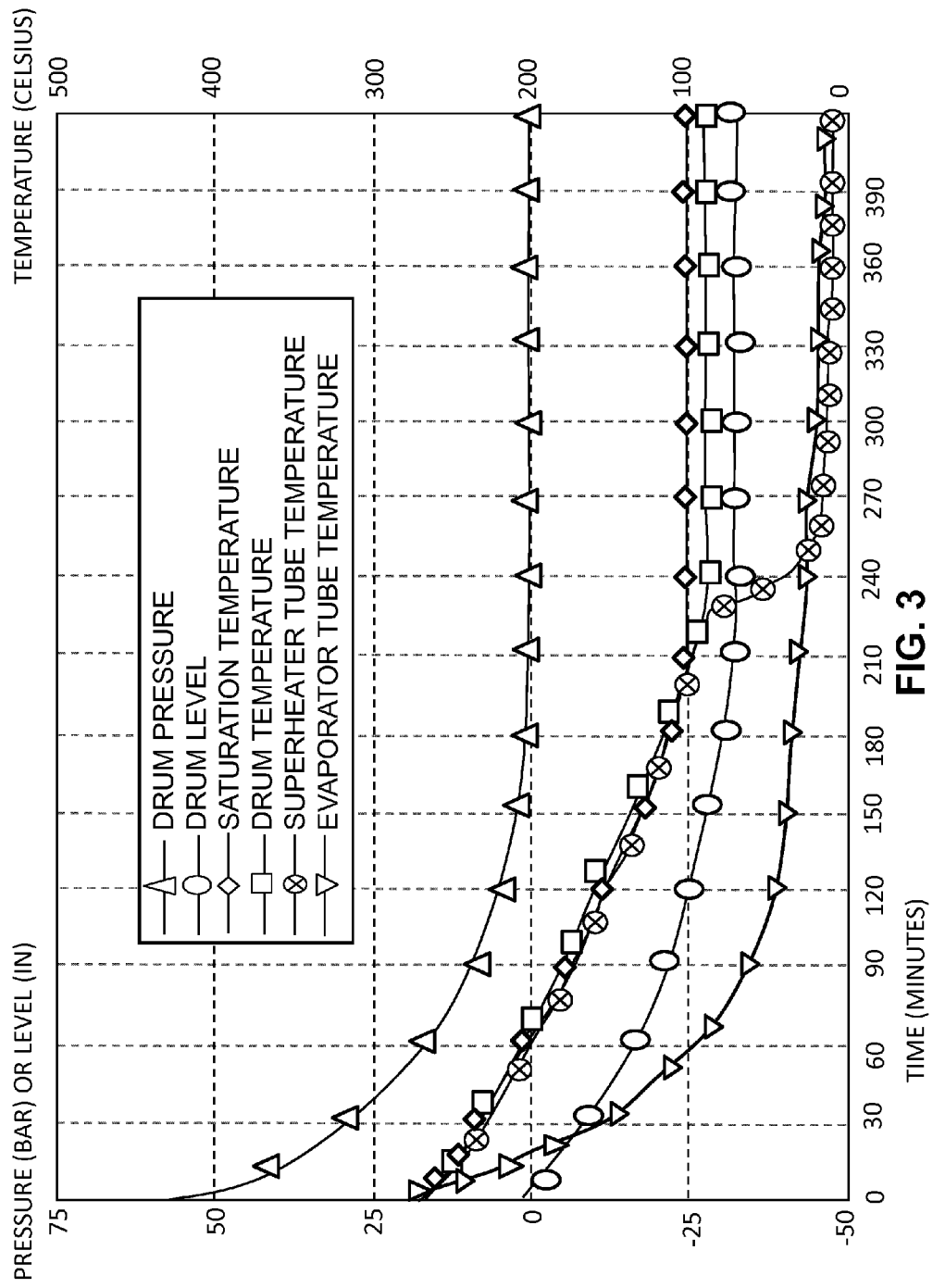
FIG. 3 depicts variations in the drum pressure, drum or vertical separator level, and temperature decay of various components of a prior art receiver after receiver shutdown.

FIG. 3 is a graph depicting variations in: (a) drum pressure; (b) drum, or vertical separator, level; and (c) temperature decay of various components of a receiver after it is shut down at the end of an operation cycle, e.g., from sunset to sunrise. Pressure of the drum, or vertical separator, is shown to decay from an initial 60 bar to ambient pressure in a period of about three hours. This relatively rapid decay in drum, or vertical separator, pressure also results in a rapid decay in drum, or vertical separator, temperature. Such temperature drops lead to a cold startup of the receiver at the next cycle, e.g., the next morning, thereby increasing the startup time of the receiver and the plant. The drum, or vertical separator, level also decays with the drum, or vertical separator, pressure decay. This may be caused by water flashing in the steam drum, or vertical separator, and transferring into the superheater.

FIG. 3 further illustrates an exemplary timeline where the temperature of the drum, or vertical separator, decays along with the saturation temperature corresponding to the drum, or vertical separator, pressure; the superheater tube temperature approaches the saturation temperature corresponding to the pressure of the drum, or vertical separator, and thereafter decays at the same rate as the saturation temperature until the pressure reaches ambient pressure, at which point, flashing in the steam drum, or vertical separator, ceases. Such flashing may effectively prevent any further transfer of fluid into the superheater. Beyond this point in the exemplary timeline, the superheater tube temperature decays rapidly to ambient temperature.

FIG. 3 further illustrates the effect, via the superheater tube temperature decay and drum, or vertical separator, level decay, of the steam transfers from the steam drum, or vertical separator, and condenses in the superheater; the evaporator tube temperature approaches the ambient temperature more rapidly, e.g., in about 30 minutes, compared to the drum, or vertical separator, temperature. The rapid decay of the evaporator tube temperature indicates that the transfer of heat from the steam drum or vertical separator and downcomers to the evaporator is minimal due to the minimal conduction heat transfer surface area.

A transient lumped model for the receiver components may be used to predict the pressure and temperature decay as a result of the thermal losses to the ambient. When the superheater is connected directly to the evaporator, the following thermal losses may contribute to the pressure and temperature decay: (i) conduction losses from the evaporator and (ii) convection and radiation losses from the superheater. The contribution of convection and radiation losses from evaporator tube surface on the pressure and temperature decay is minimal due to the minimal surface area for conduction from the fluid and metal in the evaporator tubes and the fluid and metal in the steam drum or vertical separator.

Figure 4:
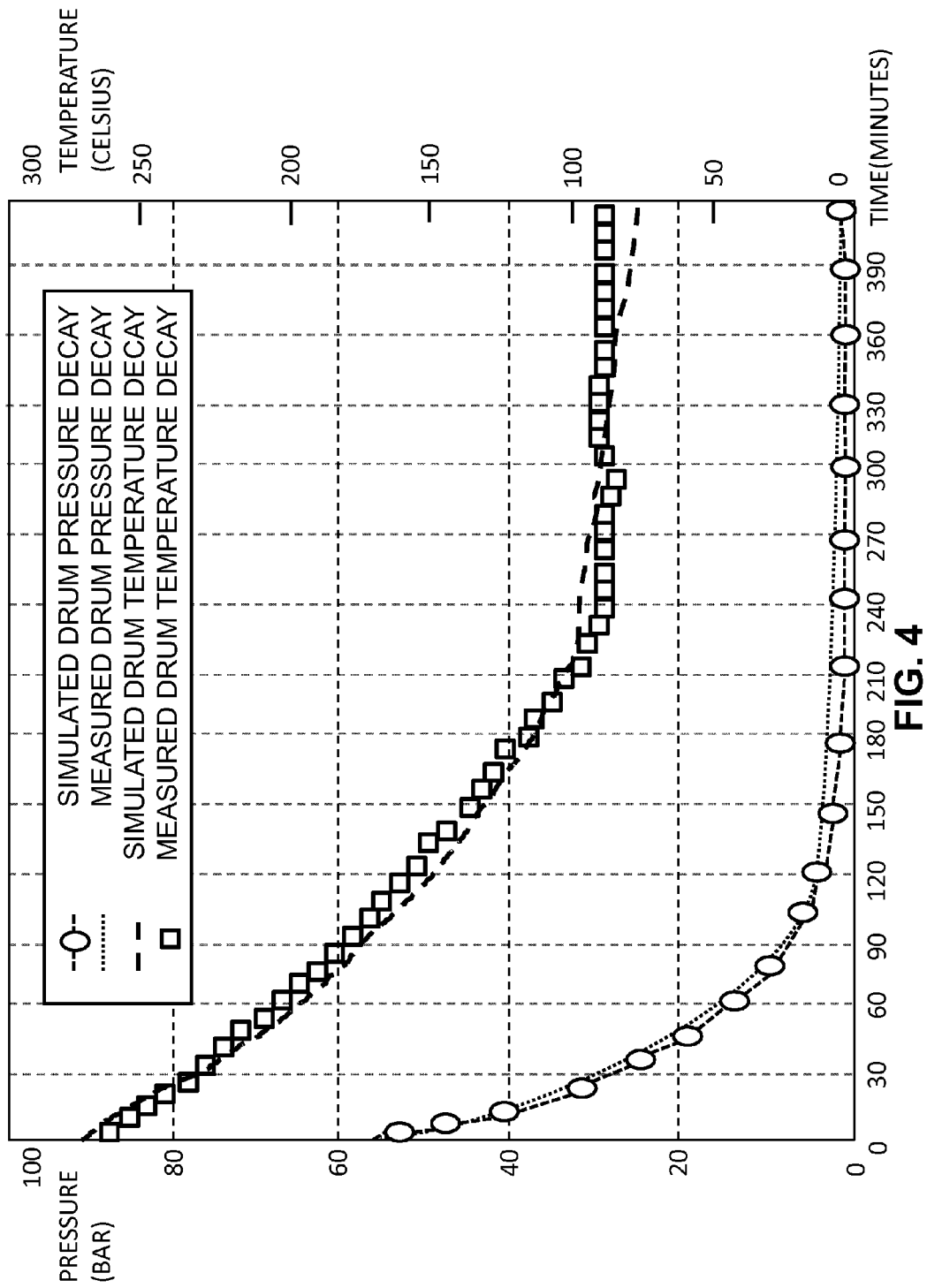
FIG. 4 depicts a comparison between modeled and measured pressure and temperature decay in the receiver after receiver shutdown.

FIG. 4 shows a comparison between the model and measured data for pressure and temperature decay overnight. The trend is generally monotonically decreasing for the simulated and measured pressure and temperature. The difference between the simulated and measured pressure and temperature is within a few percent.

Process embodiments include a method to impede the transfer of steam from the steam drum, or vertical separator, to the superheater, and thereby reduce, or minimize, the pressure and temperature decay that may occur throughout the shutdown period of a solar thermal receiver. The exemplary device embodiment is referred to as a "superheater isolation valve." To impede water from flashing into steam and transferring into the superheater, a superheater isolation valve may be employed between the superheater and the evaporator. The superheater isolation valve may be a stop valve or a flow control valve with zero leakage flow.

FIG. 5A shows an exemplary schematic of receiver system 500 components having a superheater isolation valve 550 located on the interconnecting piping 515 between the steam drum 522, or vertical separator, and the superheater section 510. This valve 550 may remain open when the receiver is in operation, i.e., when solar flux from the heliostat field is incident on the receiver. At the end of the day, e.g., at sundown or during cloud standby modes, the superheater isolation valve 550 may be closed—so as to reduce the rate of pressure and temperature decay in the receiver. To avoid circulation of water in the evaporator section, the level of the drum 522 or vertical separator, may be at a level lower than the level of the riser tubes just before closing the superheater isolation valve 550.

In some embodiments, the process may execute instructions for actuating the superheater isolation valve using steam flow measurements, e.g., from the exit for the drum, as a criterion for determining whether to open or close the isolation valve in addition or in place of a combination of pressure, temperature, a flux level on the receiver, and/or a generated power level. Flux sensors include photodiodes, visible and infrared cameras, other light sensors or imbedded flux gages—gages that may be imbedded in the receiver panels. Other inputs that could be used to determine whether to open or close the superheater isolation valve are the number of heliostats tracking the receiver, and the incident power calculated by the heliostat control system or any combination of these inputs.

Because the superheater 510 is isolated from the drum 522, or vertical separator, when the superheater isolation valve 550 is closed, the pressure decay in the superheater 510 may not affect the pressure in the drum 522, or vertical separator. Due to convective and radiative heat transfer from the evaporator tube surface, the evaporator tubes 570, and the water mass present in the evaporator tubes 570 tend to go to ambient temperature in about one hour. Conduction heat loss through the insulated evaporator components may be the primary heat transfer mode causing the pressure decay of the drum 522, or vertical separator, when the superheater isolation valve is closed. Conduction heat loss to the cold fluid and metal in the evaporator tube has a minor contribution to the temperature and pressure decay. Since the conductive heat loss from the insulation on the pressure parts as well as the surface area for conduction from the drum 522, or vertical separator, and downcomers 524 to the evaporator tubes 570 may be slow, the resulting pressure decay from the drum or vertical separator also may be very low.

Figure 5B:
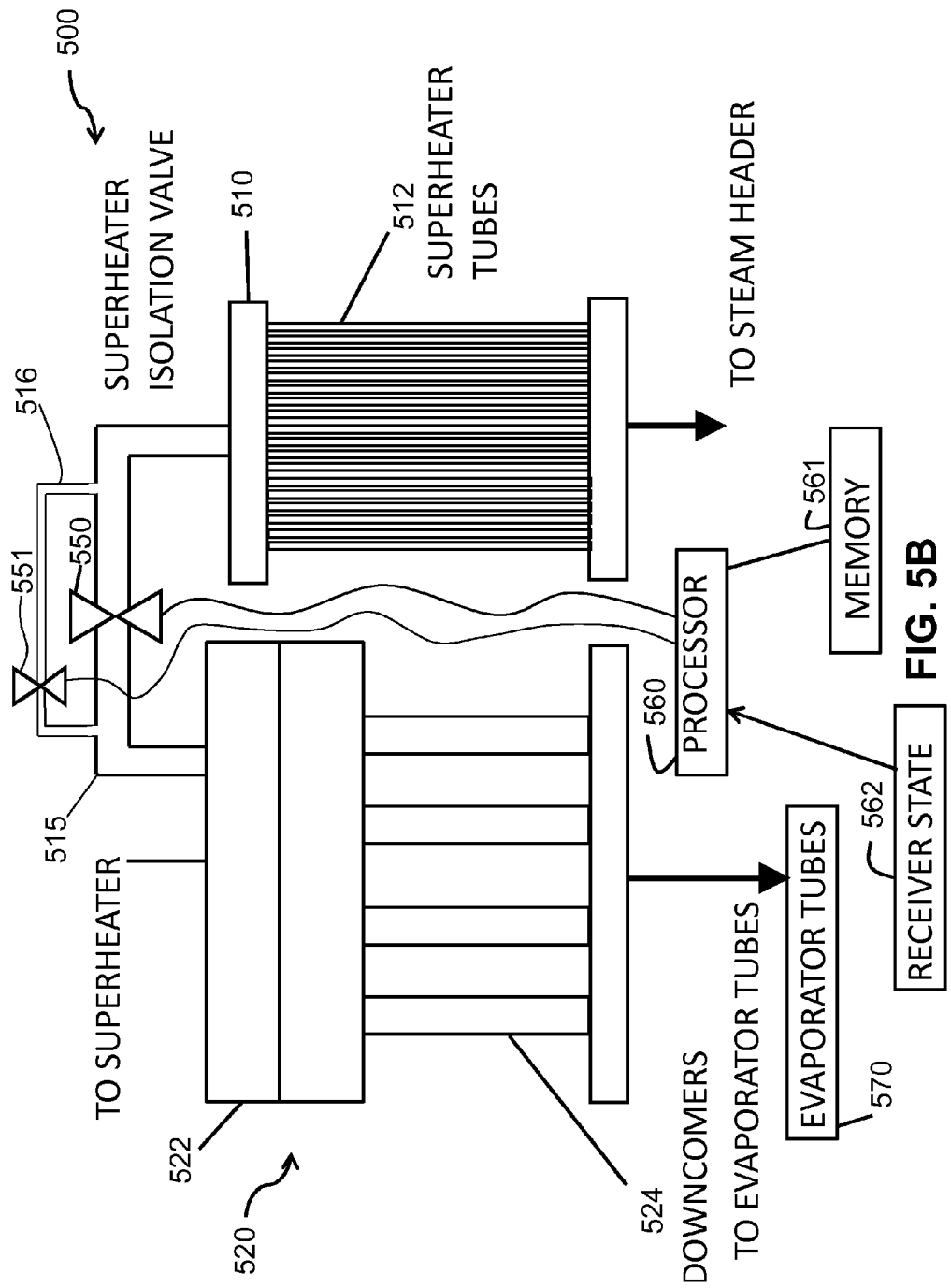
FIG. 5B is an exemplary schematic of a receiver with both a superheater isolation valve and a bypass valve.

Also, another embodiment of the stop valve may be a stop valve with a smaller bypass valve smaller in diameter than the stop valve. The small bypass valve allows a portion of the steam flow rate to bypass the main stop valve during transitions. The application of the bypass value may preserve the pressure in the steam drum better than the opening the larger stop valve alone, and yet it still allows a small amount of steam flow through superheater. Accordingly, FIG. 5B shows an exemplary schematic of receiver system 500 components having a bypass valve 551 disposed along a bypass conduit 516 about the superheater isolation valve 550 located on the interconnecting piping 515 between the steam drum 522, or vertical separator, and the superheater section 510. The bypass valve may be actuated via signals from the processor 560.

Figure 6:
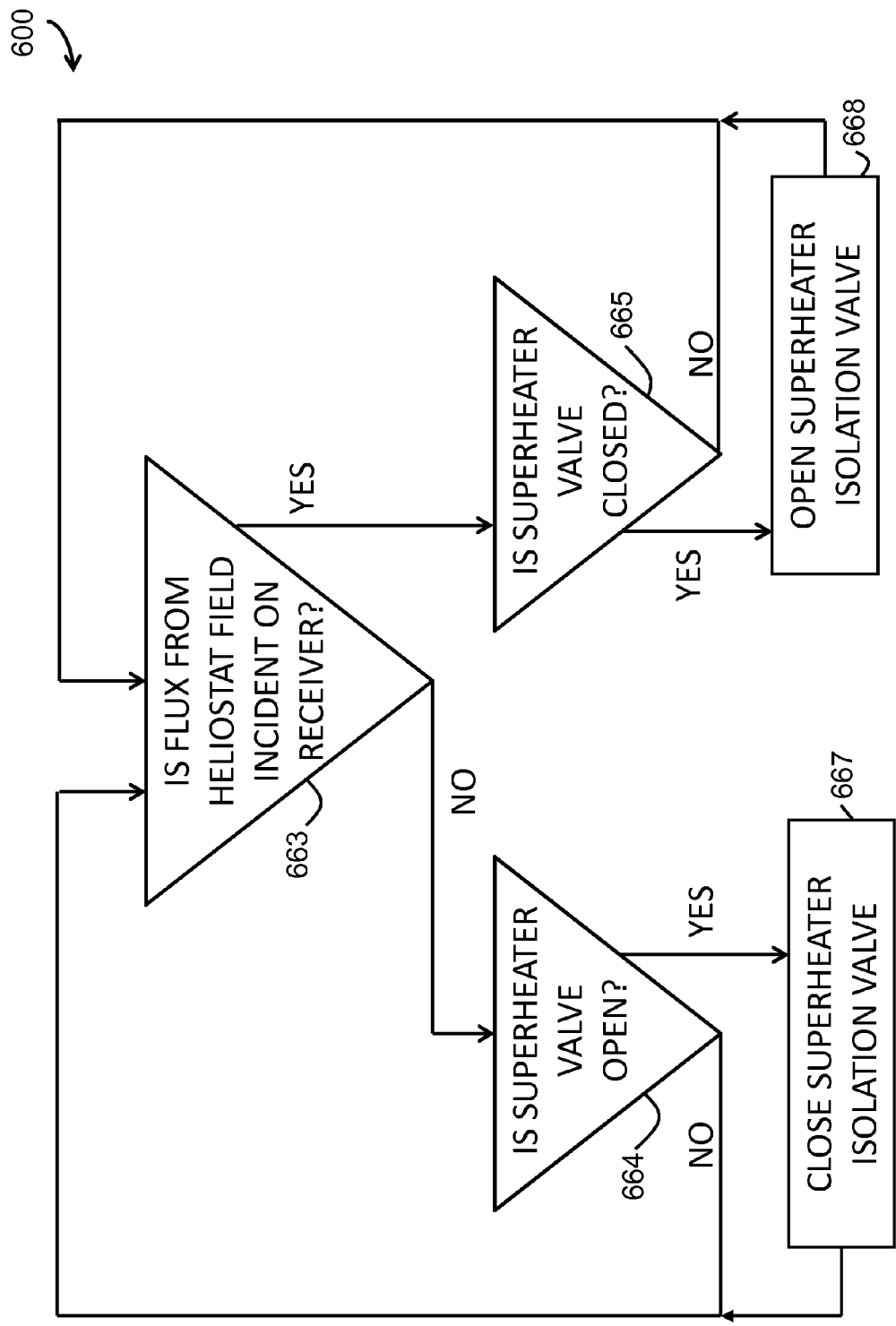
FIG. 6 depicts a flowchart of an exemplary solar thermal receiver.

FIG. 6 depicts a flowchart 600 of an exemplary processor of a solar thermal receiver. Based on instructions that may be drawn from addressable memory, the solar thermal receiver may determine whether flux from a heliostat field is incident on a receiver (step 663). If flux from a heliostat field is incident on a receiver, then the solar thermal receiver processor may determine if the superheater valve is closed (step 665). If the superheater valve is in a closed position, then it may be moved to an open position (step 668), and the solar thermal receiver status may be re-evaluated (step 663), e.g., checked again. If the superheater valve is not in a closed position, then the valve remains in the current position, and the solar thermal status may be checked again (step 663). If flux from a heliostat field is not incident on a receiver, then the solar thermal receiver processor may determine if the superheater valve is open (step 664). If the superheater valve is in an open position, then the superheater valve may be moved to a closed position (step 667), and the solar thermal receiver status is checked again (step 663). If the superheater valve is not in an open position, then the valve remains in the current position, and the solar thermal receiver status is checked again (step 663).

Figure 7:
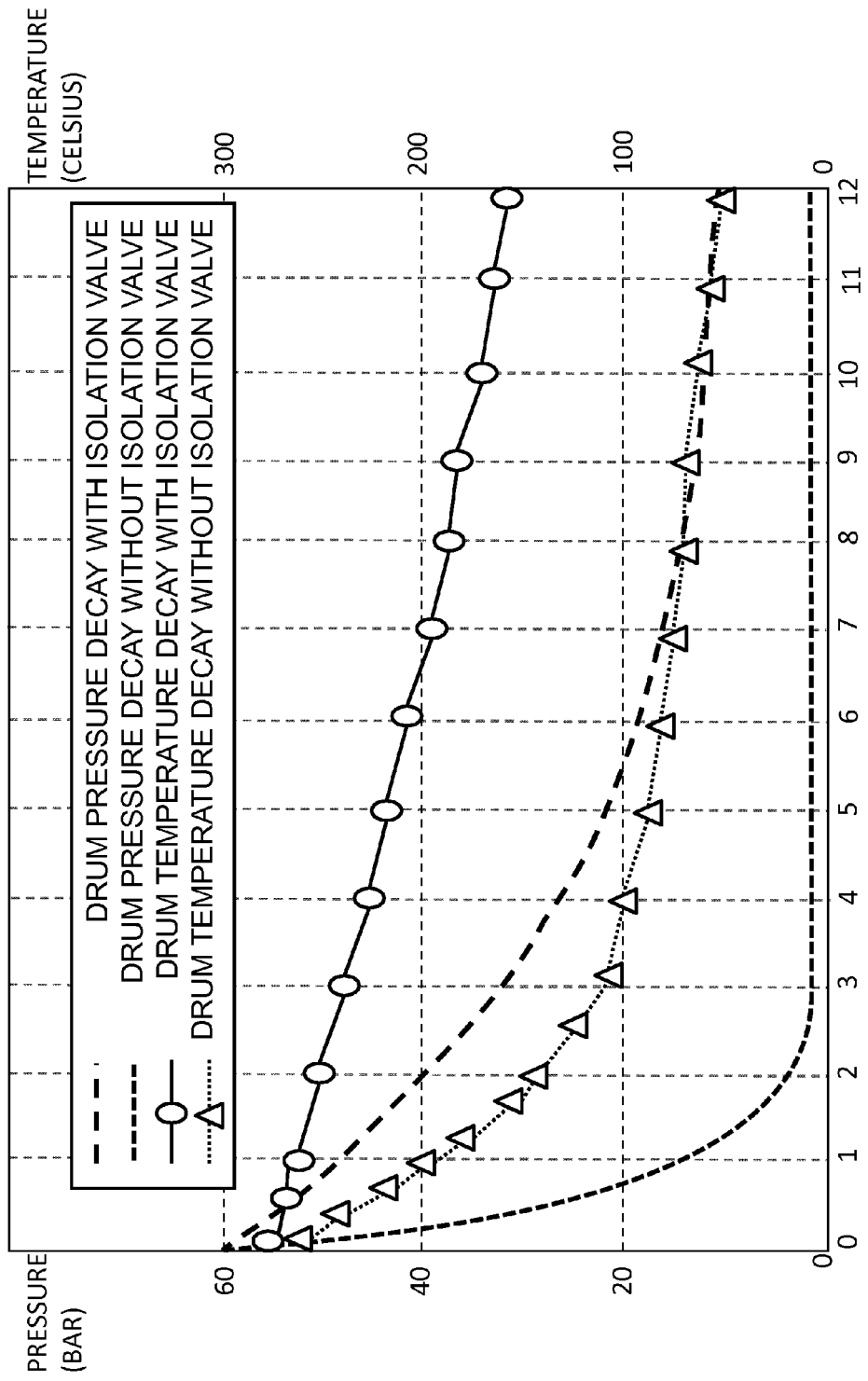
FIG. 7 depicts a comparison between pressure and temperature decay in a receiver after receiver shutdown.

A lumped model similar to the one described above may be used to model the heat loss phenomenon when the superheater isolation valve is closed, as well as compute the pressure and temperature decay when the superheater isolation valve is closed. For a typical solar-thermal receiver, a comparison of pressure and temperature decay with and without the superheater isolation valve is shown in FIG. 7. FIG. 7 illustrates that without the isolation valve, the drum, or vertical separator, pressure reaches ambient pressure in about three hours. In the embodiment with a superheater isolation valve, the pressure of the drum, or vertical separator, drops to about seven bars after a period of twelve hours. The drum, or vertical separator, temperature decays according to the saturation temperature corresponding to the drum or vertical separator pressure. This may ensure that the drum or VS is hot when it is started up at the next cycle, e.g., the next morning, thereby enabling a rapid startup.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method of preserving heat and pressure in a solar-thermal receiver assembly, the method comprising:
   determining, by a processor having addressable memory, whether solar flux is incident on a receiver; wherein
   if the solar flux is not incident on the receiver, then
      generating an actuating command, for a superheater isolation valve interposed along a fluid conduit between a steam drum and a superheater to a closed position, wherein the steam drum is upstream from the superheater;
   determining, by the processor, a solar-thermal receiver state based on measuring at least one of: pressure and temperature in the superheater;
   determining, by the processor, a range of at least one of: a temperature value, a pressure value, and a steam flow rate value, wherein the range of temperature values, the range of pressure values, and the range of steam flow rate values are between a set of minimum values and a set of maximum values for temperature, pressure, and steam flow rate;
   measuring at least one of: pressure, temperature, and steam flow rate leaving the steam drum; and wherein
   if the measured at least one of: pressure, temperature, and steam flow rate leaving the steam drum is within the determined range of at least one of: the range of temperature values, the range of pressure values, and the range of steam flow rate values, then
      generating an actuating command for the superheater isolation valve to at least one of: a fully open position and a fully closed position, wherein the actuated position of the superheater isolation valve corresponds to the determined range of at least one of: the temperature values, the pressure values, and the steam flow rate values.

2. The method of preserving heat and pressure in the solar thermal receiver assembly of claim 1, wherein the method further comprises:
   if solar flux is incident on a receiver, then
      generating an actuating command, for the superheater isolation valve interposed along a fluid conduit between a steam drum and the superheater, to an opened position, wherein the opened position is maintained so long as solar flux is incident on the receiver.

3. The method of preserving heat and pressure in the solar thermal receiver assembly of claim 1 wherein the superheater isolation valve is a stop valve.

4. The method of preserving heat and pressure in the solar thermal receiver assembly of claim 1 wherein the steam drum is a vertical separator.

5. The method of preserving heat and pressure in the solar thermal receiver assembly of claim 1, wherein the method further comprises:
   setting, by the processor, at least one of: a minimum pressure, a minimum temperature, a minimum steam flow rate, and a minimum solar flux at the receiver; and wherein determining the solar-thermal receiver state is via at least one of: a measured solar flux at the receiver, a measured pressure, a measured temperature, a measured steam flow rate in the superheater greater than at least one of: the set minimum pressure, the set minimum temperature, and the set minimum steam flow rate.

6. The method of preserving heat and pressure in the solar thermal receiver assembly of claim 1, wherein the method further comprises:
   setting, by the processor, a minimum and a maximum value for at least one of: the temperature, the pressure, and the steam flow rate value proximate to a steam drum exit.

7. The method of preserving heat and pressure in the solar thermal receiver assembly of claim 1 wherein the assembly further comprises a bypass valve disposed about the superheater isolation valve, and wherein the superheater isolation valve is a stop valve.

* * * * *